US012699193B2

(12) United States Patent
Hosemann et al.

(10) Patent No.: US 12,699,193 B2
(45) Date of Patent: Aug. 4, 2026

(54) DETECTOR MODULE FOR AN X-RAY DETECTOR HAVING A HEATING LAYER

(71) Applicant: Siemens Healthineers AG, Forchheim (DE)

(72) Inventors: Michael Hosemann, Erlangen (DE); Andrea Zang, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 164 days.

(21) Appl. No.: 18/607,733

(22) Filed: Mar. 18, 2024

(65) Prior Publication Data

US 2024/0319388 A1    Sep. 26, 2024

(30) Foreign Application Priority Data

Mar. 20, 2023    (DE) ...................... 10 2023 202 424.1

(51) Int. Cl.
G01T 1/24        (2006.01)
G01T 1/175       (2006.01)
(52) U.S. Cl.
CPC .............. G01T 1/244 (2013.01); G01T 1/175 (2013.01); G01T 1/242 (2013.01); G01T 1/247 (2013.01)
(58) Field of Classification Search
CPC ......... G01T 1/244; G01T 1/175; G01T 1/242; G01T 1/247
See application file for complete search history.

(56) References Cited

U.S. PATENT DOCUMENTS

| | | | |
|---|---|---|---|
| 2007/0029496 A1* | 2/2007 | Bouhnik ................ | H04N 23/30 250/370.15 |
| 2007/0158575 A1 | 7/2007 | Heismann et al. | |
| 2013/0248729 A1* | 9/2013 | Hannemann ........... | G01T 1/244 250/394 |
| 2018/0321396 A1* | 11/2018 | Ergler ..................... | G01T 1/241 |
| 2019/0383954 A1 | 12/2019 | Onouchi | |
| 2020/0390410 A1* | 12/2020 | Narayanaswamy . | A61B 6/4233 |
| 2024/0004091 A1 | 1/2024 | Hosemann | |

FOREIGN PATENT DOCUMENTS

| | | |
|---|---|---|
| DE | 102005061358 A1 | 7/2007 |
| EP | 4300140 A1 | 1/2024 |

* cited by examiner

*Primary Examiner* — Hugh Maupin
(74) *Attorney, Agent, or Firm* — Harness, Dickey & Pierce, P.L.C.

(57)        ABSTRACT

One or more example embodiments of the present invention relates to a detector module for an X-ray detector comprising a sensor layer in a stacked construction configured to convert incident X-ray radiation into electrical signals; a readout layer configured to read out the electrical signals from the sensor layer; and a heating layer, the heating layer including a plurality of heating elements spatially distributed in the heating layer and configured separately from one another for heating the sensor layer, and wherein the readout layer has for each heating element an associated activatable adapting unit via which each heating element is contacted for feeding in power and which is configured to adapt the power fed to each heating element.

12 Claims, 7 Drawing Sheets

DETECTOR MODULE FOR AN X-RAY DETECTOR HAVING A HEATING LAYER

CROSS-REFERENCE TO RELATED APPLICATION (S)

The present application claims priority under 35 U.S.C. § 119 to German Patent Application No. 10 2023 202 424.1, filed Mar. 20, 2023, the entire contents of which is incorporated herein by reference.

FIELD

One or more example embodiments of the present invention relates to a detector module for an X-ray detector having a heating layer. One or more example embodiments of the present invention also relates to an X-ray detector comprising a plurality of detector modules and a computed tomography device comprising such a detector module or such an X-ray detector.

Independent of the grammatical term usage, individuals with male, female or other gender identities are included within the term.

RELATED ART

An X-ray detector is used in imaging applications. An X-ray detector of this type is used, for example, for computed tomography recordings in medical imaging in order to generate a spatial image of an examination region of a patient.

X-ray detectors can therein be configured as counting, direct-converting X-ray detectors or as integrating, indirect-converting X-ray detectors. An X-ray detector, the sensor layer of which is configured as a direct-converting semiconductor layer, herein enables a quantitative and energy-selective capture of individual X-ray quanta. For the detection of the X-ray quanta, for example, semiconductor materials in the form of CdTe, CdZnTe, CdTeSe, CdZnTeSe, CdMnTe, GaAs, Si or Ge which have a large absorption cross-section for X-ray radiation, are suitable. When X-ray radiation is incident, electron-hole pairs, that is, pairs of negative and positive charge carriers are generated in the sensor layer. By way of a voltage applied to the sensor layer and/or on the surface of the sensor layer, the charge carriers are separated and move to the respective oppositely charged electrodes and/or surfaces of the sensor layer. The current generated thereby or a corresponding charge displacement can be evaluated by a downstream sensor electronics system, hereinafter also called the readout unit. The sensor layer and/or sensor unit of a direct-converting X-ray detector therein is usually present in a stacked construction with the readout layer associated with it comprising one or more readout units. Such a stacked construction of the sensor layer and the readout layer can be referred to hereinafter as a sensor board.

Direct-converting (photon-counting) X-ray detectors, in particular, must be kept at a constant temperature, as exactly as possible, during operation. Otherwise, image artifacts can occur. In the case of direct-converting X-ray detectors and/or in the detector modules of a corresponding construction, the electrical resistance of the sensor material changes with the X-ray flux. This leads to a change in the power dissipation. Thereby, however, a change in the X-ray flux causes a temperature change in the sensor layer, so that the energy resolution and the counting rate of the X-ray detector are themselves influenced. In addition to a temporally-related temperature change in the sensor layer, the drift behavior of an X-ray detector is also influenced by locally differing temperatures in the sensor layer. Such temperature gradients arise, in particular, by way of uneven heating of the sensor layer. An undesirable temperature gradient in the sensor layer can also result depending upon the operating point of the sensor board. Dependent upon the respectively selected setting of the operating parameters, for example, the mean operating temperature of the detector module and/or of the sensor material or the supply voltage applied, an increased current through the sensor material can result, which can also lead to a high level of power dissipation, even without any incident X-ray radiation and thus also to a temperature gradient in the sensor layer.

In order to avoid temperature gradients in the sensor layer, a thermal coupling, as far as possible over the whole area, to a cooling body is desirable. However, a whole-area coupling and thus an even cooling is made more difficult, for example, by components arranged on the underside of the sensor board, e.g. components serving for the connection to a module electronics system such as passive components or plugs for data transfer and/or by other mechanical cut-outs. Consequently, the cooling by way of a cooling body is greatly dependent upon the configuration of the sensor board and the geometry of the modular construction. For stabilizing the temperature of the X-ray detector, heating elements in the sensor board which are able to introduce additional heating power can also be used. However, the arrangement and configuration of the heating elements is to be matched to an existing, possibly uneven, temperature distribution in the sensor board, which leads to a firm coupling of the design of the sensor board, the cooling bodies and the carrier units.

SUMMARY

For a cost-effective development of an X-ray detector, it is desirable to develop individual components as independently of one another as possible and/or not to have to allow commitments and restrictions too early in the design process. It is also advantageous if components can be used, for example, across different detector geometries. It is also advantageous if requirements and conditions that possibly become apparent only later in the development process or during operation, can be taken into account flexibly. Specifically, a heating possibility that is adaptable as flexibly as possible to the design of the sensor board and the operating conditions is desirable for the sensor board.

One or more example embodiments of the present invention provides an advantageously flexible temperature-stabilized detector module. One or more example embodiments of the present invention also provides a correspondingly advantageous X-ray detector and a computed tomography device.

The is achieved with the features of the independent claims. Further advantageous and, partly per se inventive embodiments and developments of example embodiments are disclosed in the subclaims and the description below.

BRIEF DESCRIPTION OF THE DRAWINGS

The invention will now be described making use of exemplary embodiments, and by reference to the accompanying drawings. The illustrations in the figures are schematic, greatly simplified and not necessarily to scale. In the drawings.

DETAILED DESCRIPTION

Figure 1:
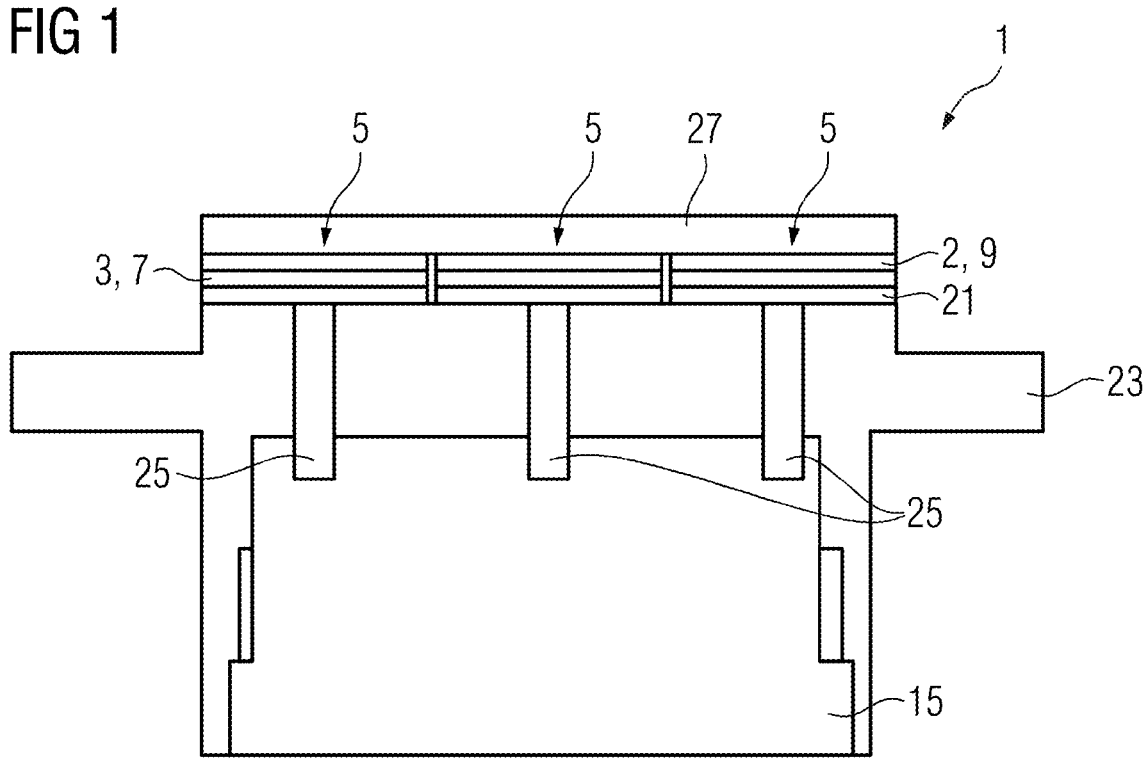
FIG. 1 shows a schematic representation of a detector module comprising a plurality of stacked constructions on a module carrier.

One or more example embodiments of the present invention relates to a detector module for an X-ray detector comprising a sensor layer in a stacked construction, configured to convert incident X-ray radiation into electrical signals, a readout layer, configured to read out the electrical signals from the sensor layer, and a heating layer. Therein, the heating layer has a plurality of heating elements arranged spatially distributed in the heating layer, for heating the sensor layer. Furthermore, the readout layer has for each heating element an associated activatable adapting unit, via which each heating element is contacted for feeding in power, and which is configured to adapt the power fed to a respective heating element.

The X-ray detector module according to one or more example embodiments of the present invention has a stacked construction. The stacking direction can be oriented, in particular, substantially parallel to the operational incidence direction of an X-ray radiation. The sensor layer is therein preferably arranged in the stacked construction closest to the X-ray radiation source, so that the X-ray radiation is incident, in particular, directly onto the sensor layer.

Suitably, the sensor layer comprises at least one direct-converting converter element made of a suitable material, in particular cadmium telluride (CdTe) or cadmium zinc telluride (CdZnTe). Semiconductor materials of this type enable the direct conversion of the X-ray radiation incident upon them into an electrical signal and can be obtained commercially in good quality with regard to charge transport properties and homogeneity. The sensor layer can also comprise another semiconductor material in the form of CdTeSe, CdZnTeSe, CdMnTe, GaAs, Si or Ge. Even if the temperature stabilization in direct-converting detectors has a particularly great significance, a configuration of a detector module according to one or more example embodiments of the present invention can also comprise a sensor layer having an indirect-converting converter element in combination with a photodiode array. As the converter material, scintillators, for example GOS ($Gd_2O_2S$), CsJ, YGO or LuTAG are often utilized.

The sensor layer of a detector module can be configured in one piece. However, it can also be formed from a plurality of converter elements arranged stacked against one another, which together span the sensor layer.

The readout layer can comprise, in particular, a large number of pixel electronics units, wherein each pixel electronics unit can be configured for pixel-wise processing of the electrical signals fed from the sensor layer into a pixel electronics unit to a digital pixel measurement signal, with which a spatially resolved detection of the X-ray radiation in the detector module is achieved. Each pixel electronics unit of this type can be configured at least to further process, in particular to digitize, an electrical signal received from the sensor layer, for example via an A/D (analog-to-digital) converter. The pixel electronics units can also have further switching elements, for example, a signal amplifier or a comparator. For this purpose, the readout layer and/or a pixel electronics unit of the readout layer can be coupled via electrically conducting connections to the sensor layer. The electrically conducting connections between an evaluating unit and a converting unit can be configured, for example, as solder connections, for example, so-called bump bonds, as conductively-glued connections or by other means. For the least possible influence on the signal transmission between the sensor layer and the readout layer, the closest possible arrangement of the sensor layer and the readout layer is advantageous.

The readout layer can be configured in the form of one or a plurality of readout units arranged adjacently in the readout layer, for example in the form of an integrated circuit (IC). A readout unit can be understood, for example, as an encapsulated or as a so-called unhoused "bare die" (also called a "bare chip") circuit component which is present separately in the readout layer and which provides a plurality of pixel electronics units for the primary processing of the electrical signals from the sensor layer. In particular, the readout layer can comprise one or more application-specific integrated circuits (ASICs) which are included together by the readout layer of the detector module.

The readout layer can further comprise a housing in which a readout unit described above or a plurality of adjacently arranged readout units is or are enclosed. Furthermore, an embedding of one or more such readout units in an embedding material, in particular a casting with a casting mass, for example a casting resin, into a component is possible. So-called unhoused "bare dies" are often used in an embedding.

The heating layer included by the stacked construction of the detector module is thermally coupled in the stacked construction to the sensor layer. In a projection layer perpendicular to the stacked construction, it at least partially covers the areal extent of the stacked construction. A covering by the heating layer can be understood to mean that over the area associated with the heating layer, a plurality of heating elements are provided which enable heating power, i.e. heat, to be introduced via this area of the heating layer into the stacked construction. In preferred configurations, the heating layer extends over at least the majority of the areal extent of the sensor layer. Since the heating layer covers a majority of this areal extent, an introduction of heating power via the heating layer can advantageously be enabled over the entire covered areal region and thereby a temperature stabilization can be enabled. The larger the area covered thereby, the more advantageously an introduction of heating power can take place. In particularly advantageous embodiments, the heating layer substantially completely covers the areal extent of the sensor layer in a projection plane perpendicular to the stacked construction.

The heating layer can be thermally coupled via the readout layer to the sensor layer. In this case, it is advantageous if the readout layer, comprising a possible housing or an at least partial covering via a casting compound extends in the projection plane perpendicular to the stacked construction over at least the majority of the area of the sensor layer. In this way, an introduction of heating power into the sensor layer via the readout layer over the largest possible area can be enabled. However, an arrangement of the heating layer between the sensor layer and the readout layer or another arrangement is also conceivable. In particular, the heating layer can also be embedded in an embedding material of the readout layer.

The heating layer has heating elements which are configured for introducing heating power into the stacked construction when they are supplied with power during operation, i.e. they are connected to a current and/or voltage source and are operated thereby. The heating layer thus permits heating power introduced via the heating elements to contribute to a temperature stabilization of the detector module and, for example, to counteract temperature gradients within the stacked construction and/or the sensor layer. The heating elements can be configured, for example, as simple heating resistors. They can be configured as conductor loops that are included by the heating layer. However, they can also be part of circuit elements. The heating elements of the heating layer can also be arranged substantially within a plane. According to one or more example embodiments of the present invention, the heating elements in the heating layer are configured separate from one another.

Each heating element heats a partial heating region of the heating layer. This means that the heating power introduced by a heating element covers a partial area region of the total area of the stacked construction covered by the heating layer. In other words, the heating layer has a plurality of partial heating regions, wherein each partial heating region comprises a heating element which is configured, when supplied with power, to heat the respective areal region of the stacked construction that is covered by the partial heating region. For example, the heating layer has more than three heating elements, specifically for example, 9, 16 or 25.

The subdivision of the heating layer into partial heating regions by the heating elements provides a primary possible spatial resolution by the heating layer in which a heating power to be introduced into the stacked construction is locally adaptable in that the partial heating regions can be differently supplied with power. The larger the number of heating elements and therefore partial heating regions, the finer the heating power distribution can be adapted. The subdivision can be even, i.e. the partial heating regions and their heating elements can each cover an equal-sized partial area and can be arranged regularly over the area of the heating layer. In particular, the partial heating regions of the heating layer can be identically configured, i.e. configured to emit the same heating power given the same framework conditions and the same power supply. In particular, they can comprise identical heating elements. However, they can also cover different areas and/or can be arranged irregularly. A substantially regular arrangement or identical configuration can, however, represent an advantageously simple implementation.

The feeding of power to a heating element takes place, according to one or more example embodiments of the present invention, via the adapting unit associated with a heating element in the readout layer. The stacked construction makes available a corresponding electrically conductive contacting between each heating element of the heating layer and the adapting unit associated with it in the readout layer. An adapting unit according to one or more example embodiments of the present invention is associated with a heating element in the sense that the adapting unit is configured to adapt the power fed to a heating element and thus the heating power produced by the heating element. Therein, it is made possible in particular that the power fed to each heating element is adaptable separately from the other heating elements. An adapting unit can be implemented in the form of one or more circuit elements in the readout layer. In particular, the adapting unit is controllable. This means that it can be set via a control signal transmitted to it such that an adaptation of the power supplied to one heating element is achieved. A possible configuration of an adapting unit can provide an implementation in the form of one or more switches which can connect a heating element to at least two different power units. An adapting unit of a heating element can also be configured such that it is configured for a regulation of a power provided, i.e. for example, a regulation of a voltage that is fed to a heating element. Other implementations are also conceivable.

The heating matrix of the heating layer in the stacked construction subdivided into partial heating regions enables a heating layer in the detector module to be provided that is as generically designed as possible and is universally usable in the detector module and which by way of its subdivision, provides the possibility of a local adaptation of the heating power distribution to the specific prevailing conditions. The heating layer can be designed to be primarily independent of further components of the detector module, for instance the configuration of an adjacent cooling body or a module carrier, and implemented in the stacked construction. An adaptation to the specific existing heating power requirement of the detector module as is then implemented in a device can then be implemented via the adapting unit which is associated with a heating element and is provided in the readout layer of the stacked construction. With an implementation of this type, the detector module can be easily adapted to a specific configuration of a detector module, but also to changeable conditions during the operation of the detector module. For example, a unit that is usable as generically as possible consisting of a sensor layer, a readout layer and a heating layer can be prepared for different detector geometries with differently configured cooling bodies or cabling arrangements, which during operation can also be adapted to an actually existing and also temporally changeable distribution of the heating requirement. The arrangement of a corresponding adapting unit in the readout layer is therein advantageous. This can thus be implemented, for example, as circuit elements in the existing readout unit (s) and produced in a common semiconductor process or can be integrated into a readout package as separate circuit elements, for example, embedded together with a readout unit in an embedding material and can thus be provided as an easily constructed and usable component. In contrast to an external arrangement of adapting units outside the stacked arrangement, a cabling effort and a consequent assembly effort can be reduced.

According to an advantageous embodiment variant of the detector module, the heating layer is subdivided into a plurality of partial heating regions, each having at least one heating element in the form of a heating resistor. The readout layer further has a connecting unit for each heating element that is configured to connect the associated heating element in a manner able to be switched at least either to one of the first or one of the second power units for the supply of power. It is therein made possible, in particular, that each heating element can be switched separately from the other heating elements in a manner able to be switched either at least to the first or to the second power unit. A connection to more than two power units, for example three or four, can also be provided. For example, this can comprise at least two or more voltage supplies which provide a different voltage for the operation of the heating element. Each power supply unit can also comprise a heating regulator so that, dependent upon the setting of each heating regulator, different voltage values can be output. In this way, a temporal adaptation of the power output during operation is also advantageously easily enabled, for example, with regard to temporally varying temperatures in the stacked construction. Advantageously, an implementation via a connecting unit represents a suitably simple and robust and fault-resistant implementation.

An implementation of the connecting unit can be undertaken, for example, in the form of one or more transistors. An activation can take place in the form of configuration signals via an SPI bus.

According to a development thereof, a first feed line from the at least one first, and a second feed line from the at least one second, power supply unit is included by the heating layer, wherein for each partial heating region of the heating layer, contacts are provided on the first and the second feed line which enable a contacting of the feed lines to the associated connecting unit in the readout layer. If more than two power units are accordingly provided for the feeding of power, then accordingly, more feed lines and contacts are implemented.

The feed line via the heating layer advantageously enables the implementation of heating elements and feed lines in a shared production process. This can comprise, for example, a lithographic application of conductor tracks. Furthermore, thereby, a greater spatial separation between the feed lines and the readout unit (s) can be achieved, which can be advantageous with regard to a fault-proneness.

According to an embodiment variant of the detector module, the heating layer is subdivided into a plurality of partial heating regions, each having at least one heating element in the form of a heating resistor, and wherein the readout layer comprises a heating regulator for each heating element as an activatable adapting unit, which is configured to adapt the power fed to a respectively associated heating element. Therein, it is made possible, in particular, that the power fed in for each heating element can be regulated separately from the other heating elements. The power fed to the heating regulators for the plurality of heating elements can then be provided by a common power supply unit. An activation can accordingly be carried out, as above, with activation signals via an SPI bus.

Advantageously, in this way, a reduction of the feed lines and the contacts required can be achieved. Furthermore, for each heating element, the power fed in can advantageously be individually adaptably configured in a particularly flexible manner.

In an advantageous configuration thereof, the heating regulator is implemented as a switching controller. Advantageously, a simple and economical implementation is provided, wherein the switching controllers also have a low power dissipation.

Settable linear voltage controllers can represent an alternative variant. These have an advantageously low interference susceptibility. However, they have a higher power dissipation which can counteract their use as heating regulators in a disadvantageous manner.

In the readout layer, the activatable adapting units are arranged grouped at least for a group of heating elements. The adapting units of all the heating elements can be arranged in a common group or adapting units can also be arranged respectively grouped for groups of heating elements.

According to one embodiment variant of the detector module, the readout layer has a number of readout units in the form of integrated circuits, wherein the adapting units are formed integrated into at least one readout unit. Advantageously, the adapting units are to be taken into account only in the circuit design of the corresponding readout unit, although in the production, a common semiconductor process can be used for the preparation.

According to one embodiment variant of the detector module, the readout layer has a number of readout units in the form of integrated circuits, wherein the adapting units are present as a circuit separate from the readout units. The adapting units can be produced, for example, in the form of a separate die in a separate semiconductor process and can be integrated into a package, for example, by way of a suitable embedding with which one or more readout units of the readout layer are integrated.

Advantageously, it can for example be provided, by way of improvement, that the adapting units can switch higher voltages than the readout units, wherein also less consideration must be given to possible disturbances. Furthermore, in an implementation of this type, no changes to already existing readout unit designs are necessary, so that existing components can be utilized without having to dispense with an improved temperature stabilization as proposed herein.

According to an embodiment variant, the heating layer is applied to a surface of the readout layer or is embedded in an embedding material of the readout layer.

The closest possible arrangement of the heating layer relative to the sensor layer is advantageous since the temperature of the sensor is the decisive parameter for image quality. The application onto a surface of the readout layer or the integration into the readout layer by an embedding into an embedding material of the readout layer further represents a simply provided embodiment variant since herein necessary heating elements and lines are more easily able to be integrated and applied. The heating elements of the heating layer can be embedded, for example, in a housing or a jacket of a readout unit or a plurality of readout units formed, for example, by a casting compound, of the readout layer or can be applied on a surface of such a housing or such a jacket. The heating elements of the heating layer can be configured in the form of heating resistors, e.g. heating loops, which are applied on a surface of the readout layer or are integrated into the readout layer. For a feeding of power to the heating elements of the heating layer, it can be particularly suitable to provide the heating layer at or on a side of the readout layer that faces away from the sensor layer. This can also be advantageous for the most undisturbed possible transmission of the signals from the sensor layer to the readout layer.

According to an alternative variant for applying or integrating the heating layer on and/or in the readout layer, the heating layer is applied on a surface of a carrier unit arranged downstream in the stacked arrangement of the readout layer along a radiation incidence direction or is embedded in a material of the carrier unit. A carrier unit can exist, for example, in the form of a circuit board or a ceramic. This can also serve, for example for feeding electrical lines for the operation of the detector module.

Advantageously, a separate production of the readout layer and the heating layer is possible.

According to a further embodiment variant of the detector module, the readout layer itself serves as a heating layer and has a plurality of readout units in the form of integrated circuits, wherein circuit elements of the integrated circuits serve as heating elements, and wherein by way of an adaptation of the operational setting of the readout units, the power that is fed to each heating element is adaptable.

The plurality of readout units arranged in the readout layer thus represents a heating layer subdivided into partial heating regions, wherein the active circuits of the integrated circuits themselves serve as heating elements. Via changes in the operational settings of the individual readout units, for example, by way of a changed setting of bias currents, a power consumption can be specifically changed and thus a heating power generated can be adapted. Advantageously, the least possible adaptation to existing designs of detector modules can be needed. Furthermore, the provision of additional power supplies in the detector module or lines in the stacked construction for this can advantageously be avoided, since components of the detector module provided for operation of the readout unit can be drawn upon. Circuit elements for the activation, i.e. the adapting unit, can be integrated into the readout unit itself and activated via control signals for the readout unit. Such a configuration is particularly advantageous if only low heating power levels are necessary.

According to an advantageous configuration of the detector module, at least one temperature sensor is arranged in the stacked construction and the detector module has at least one control unit which is configured to adapt the activatable adapting unit on the basis of a measurement value from the temperature sensor.

In this way, the heating power requirement in the stacked construction can advantageously be taken into account temporally variably and the adapting units can be activated accordingly. In particular, a temperature progression can advantageously be taken into account during the operation or different operating parameters and/or environmental parameters of the detector module can be taken into account in the temperature stabilization. In advantageous configurations, a plurality of temperature sensors are provided so that a current temperature distribution can be captured spatially resolved in an improved manner in a projection plane perpendicular to the stacked construction on the basis of a plurality of measurement values.

The control unit itself can be implemented in the stacked construction, for example integrated in one or more readout units. It can also be provided separately therefrom. In advantageous embodiments, the temperature sensor is integrated into the readout layer. It can be implemented, for example, in the readout unit (s). However, it is also possible that it is present separately from the readout units but, for example, embedded in a common embedding material in the readout layer.

Furthermore, the stacked construction of the detector module can be arranged on a module carrier which is thermally coupled via the stacked construction to the sensor layer. The module carrier can be configured for mechanical fixing of a respective detector module in a device comprising the detector module. For this purpose, corresponding fixing means and orienting means can be provided on the module carrier. The module carrier is preferably configured as a metallic cooling body which enables the conducting away of heat from the stacked construction and, in particular, the sensor layer for the temperature stabilization of the detector module.

Suitably, the stacked construction can be connected via the module carrier to a module electronics system. The module electronics system can serve for a readout, collection and/or further processing of the measurement data from the readout layer. The module electronics system can have further active or passive components which are configured to provide the necessary functionalities. The module electronics system can further serve for the transmission of activation data and the power supply for the operation of the stacked construction.

In particular, one or more power units can be included for the supply of the heating layer with power from the module electronics system. The module electronics system typically offers sufficient space for the arrangement of power units. Advantageously, these are nevertheless provided relatively close to a stacked construction in each case. Therein, the exchange of individual components is also more easily possible in the event of a fault.

Furthermore, according to one embodiment, the detector module can comprise a number of mutually adjacent stacked constructions arranged on the module carrier. For example, 2, 3 or 4 identically configured stacked constructions can be included by the detector module. Advantageously, by way of the stacking together, a larger extent of the overall detection area of the module can be achieved. The plurality of stacked constructions can be associated with a common module electronics system and can be supplied or activated thereby. The adapting units of each stacked construction are preferably controllable or regulable independently of the other stacked constructions. In this way, possibly different boundary conditions of the stacked constructions such as a one-sided air supply in the cooling of the detector module can be taken into account. Herein, cooling air used for cooling flows along the detector module and becomes heated. Accordingly, the sensor layer of a sensor board of a detector module arranged at the beginning of the cooling air path is cooled more strongly than the sensor layer of a sensor board arranged at the end of the cooling path.

One or more example embodiments of the present invention further relates to an X-ray detector for recording images of an object transirradiated by X-ray radiation, comprising a plurality of detector modules according to one of the variants described above arranged adjoining one another. The number of detector modules used in an X-ray detector is dependent upon their size and the overall sensor area required. The X-ray detector can comprise further elements, for example carrier constructions for the arrangement of the detector modules, cooling air supply and removal for an improved heat removal from the detector modules or an anti-scatter grid which is arranged in the radiation incidence direction before the sensor layer of the detector modules.

All the variants described above in relation to the detector module according to one or more example embodiments of the present invention can correspondingly also be implemented in the X-ray detector. The description set out in relation to the detector module and the above-described advantages of the detector module can accordingly be transferred also to the X-ray detector according to one or more example embodiments of the present invention.

In particular, one or more example embodiments of the present invention further relates to a medical imaging device comprising at least one detector module or an X-ray detector as described above. The medical imaging device comprises, in opposition thereto, an X-ray source which is configured to irradiate the detector module and the X-ray detector with X-ray radiation.

All the embodiment variants described above in relation to the detector module according to one or more example embodiments of the present invention can correspondingly also be implemented in the medical imaging device. The description set out in relation to the detector module and the above-described advantages of the detector module can accordingly be transferred also to the medical imaging device.

In particular, the medical imaging device can be a computed tomography device. The X-ray source and an X-ray detector are therein arranged on a rotor which enables a rotation about a rotation axis. The computed tomography device can therein also comprise more than one X-ray detector. For the recording of a computed tomography image dataset, typically an object to be imaged is placed, along the rotation axis, between the X-ray source and the detector unit and is transirradiated via the X-ray source. The medical imaging device can however also be a different imaging device on the basis of X-ray radiation, for example, a mammography device, a C-arm X-ray device or an angiography device.

In addition, in the context of one or more example embodiments of the present invention, features which are described in relation to different embodiments of the invention can be combined to further embodiments of the invention. Apart from the embodiments of the invention expressly described in this application, many further embodiments of the invention are conceivable, at which a person skilled in the art could arrive without departing from the scope of the invention as disclosed by the claims.

The use of the indefinite article "a" or "an" does not preclude that the relevant feature can also be present plurally. The use of the expression "have" does not preclude that the concepts linked via the expression "have" can be identical. For example, the computed tomography device has the computed tomography device. The use of the expression "unit" does not preclude that the subject matter to which the expression "unit" relates can have a plurality of components that are spatially separated from one another.

FIG. 1 shows an exemplary embodiment variant of a detector module 1 for an X-ray detector 36.

The embodiment shown comprises a plurality of identically configured stacked constructions 5 arranged adjoining one another. A detector module 1 according to one or more example embodiments of the present invention can however also be configured differently. For example, a detector module 1 can also comprise just one stacked construction 5.

The stacked construction 5 shown here has a sensor layer 2, a readout layer 3, and a carrier unit 21.

In preferred embodiments, the sensor layer 2 of a stacked construction 5 comprises a direct-converting converter element 9. However, it is also conceivable that the sensor layer 2 comprises an indirect-converting converter element in combination with a photodiode array. The sensor layer 2 of a stacked construction 5 can be configured in one piece. However, it can also be formed from a plurality of converter elements 9 arranged stacked against one another, which together span the sensor layer 2.

The readout layer 3 can be configured in the form of one or a plurality of readout units 7 arranged, for example, in the form of an integrated circuit, in particular an ASIC. A readout unit 7 is then a component which provides a plurality of pixel electronics units for the spatially resolved primary processing of the electrical signals from the sensor layer 2.

The carrier unit 21 can comprise, for example, a circuit board or a ceramic. Typically, the carrier unit 21 comprises electrical lines for the feeding in and out of signals or operating voltages. Further active or passive components which are needed for the operation of the stacked arrangement can also be provided on the carrier unit 21. They can also serve as a carrier unit 21 for a plurality of readout units 7.

A detector module according to one or more example embodiments of the present invention and/or its stacked construction 5 also has a heating layer 4 (not shown here for the sake of clarity), as explained in greater detail below on the basis of the examples in FIGS. 2 to 7.

A heating layer according to one or more example embodiments of the present invention therein has, in particular, a plurality of heating elements 10 arranged spatially distributed in the heating layer 4, for heating the sensor layer 2. Furthermore, the readout layer 3 has for each heating element 10 an associated activatable adapting unit 11, 12, 14, 16, 7 via which each heating element 10 is contacted for feeding in power and which is configured to adapt the power fed to each heating element 10.

A heating layer 4 provided according to one or more example embodiments of the present invention can be applied to the surface of the readout layer 3, for example on a housing of a readout unit 7. In other embodiment variants, the heating layer 4 can also be embedded in an embedding material of the readout layer 3 or also separately from the readout layer 3 on the carrier unit 21 or can be integrated therein. A transposition is also possible, wherein the readout layer 3 itself serves as the heating layer 4.

In a projection layer perpendicular to the stacked construction 5, the heating layer 4 covers the areal extent of the stacked construction at least partially, and in preferred embodiments at least mostly. Since the heating layer covers a majority of this areal extent, an introduction of heating power via the heating layer 4 can advantageously be enabled over the entire covered areal region and thereby a temperature stabilization can be enabled.

The heating matrix of the heating layer 4 in the stacked construction 5 subdivided into partial heating regions 8 enables a heating layer 4 to be provided in the detector module 1 that is designed as generically as possible and is universally usable and which by way of its subdivision, provides the possibility of a local adaptation of the heating power distribution to the specific prevailing conditions. An adaptation to the specific existing heating power requirement of the detector module 1 as is then implemented in a device can then be implemented via the adapting unit which is associated with a heating element 10. With an implementation of this type, the detector module 1 can be easily adapted to a specific configuration of a detector module 1, but also to changeable conditions during the operation of the detector module 1.

In the case of the exemplary detector module 1 shown in FIG. 1, the stacked constructions 5 are arranged on a metallic module carrier 23. They are also connected via the module carrier 23 to a module electronics system 15, from which outgoing data lines 25 extend to the respective stacked constructions 5, referred to as sensor boards. The module electronics system 15 can serve for a readout, collection and/or further processing of the measurement data from the readout layer 3. The module electronics system 15 can further serve for the transmission of activation data and the power supply for the operation of the stacked construction 5. In particular, a number of power supply units 13, 17 for the supply of the heating layer 4 according to one or more example embodiments of the present invention of each stacked construction 5 with power from the module electronics system 15 can be included and/or arranged thereon. The module electronics system 15 typically offers sufficient space for the arrangement of the power supply units 13, 17.

Furthermore the sensor surface of each stacked construction 5 is covered by a collimator 27 which serves to generate a parallel beam path and the prevention of scattered radiation.

The module carrier 23 herein further serves as a cooling body for removing heat from the stacked constructions 5. The module carrier 23 is thermally coupled via the stacked construction 5 to the sensor layer 2 of a respective stacked construction 5.

Figure 2:
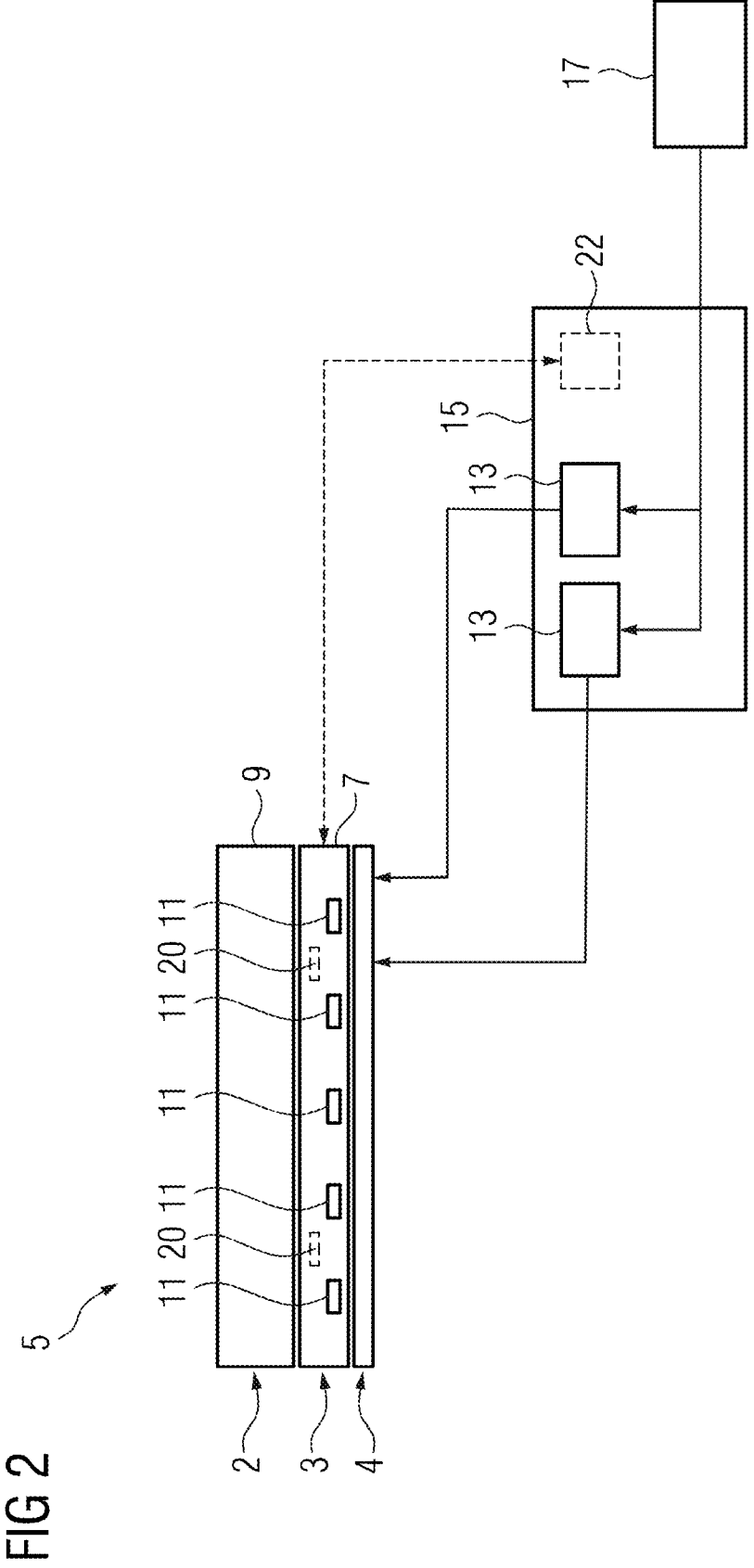
FIG. 2 shows a schematic representation of a stacked construction of a detector module according to one embodiment variant.

FIG. 2 shows a schematic detailed representation of a stacked construction 5 of a detector module 1 with a heating layer according to one embodiment variant, such as can be utilized in a detector module 1 as shown in FIG. 1.

The stacked construction 5 shown has a sensor layer 2 comprising a converter element 9, a readout layer 3 comprising a readout unit 7 in the form of an ASIC and a heating layer 4 which is arranged downstream of the readout layer 3 in the stacked construction.

The heating layer 4 can herein be provided, for example, on the surface of the readout layer 3, for example, on a housing of the readout unit 7 or, for example, on a carrier unit 21 (not shown here) or embedded in a material thereof.

Figure 3:
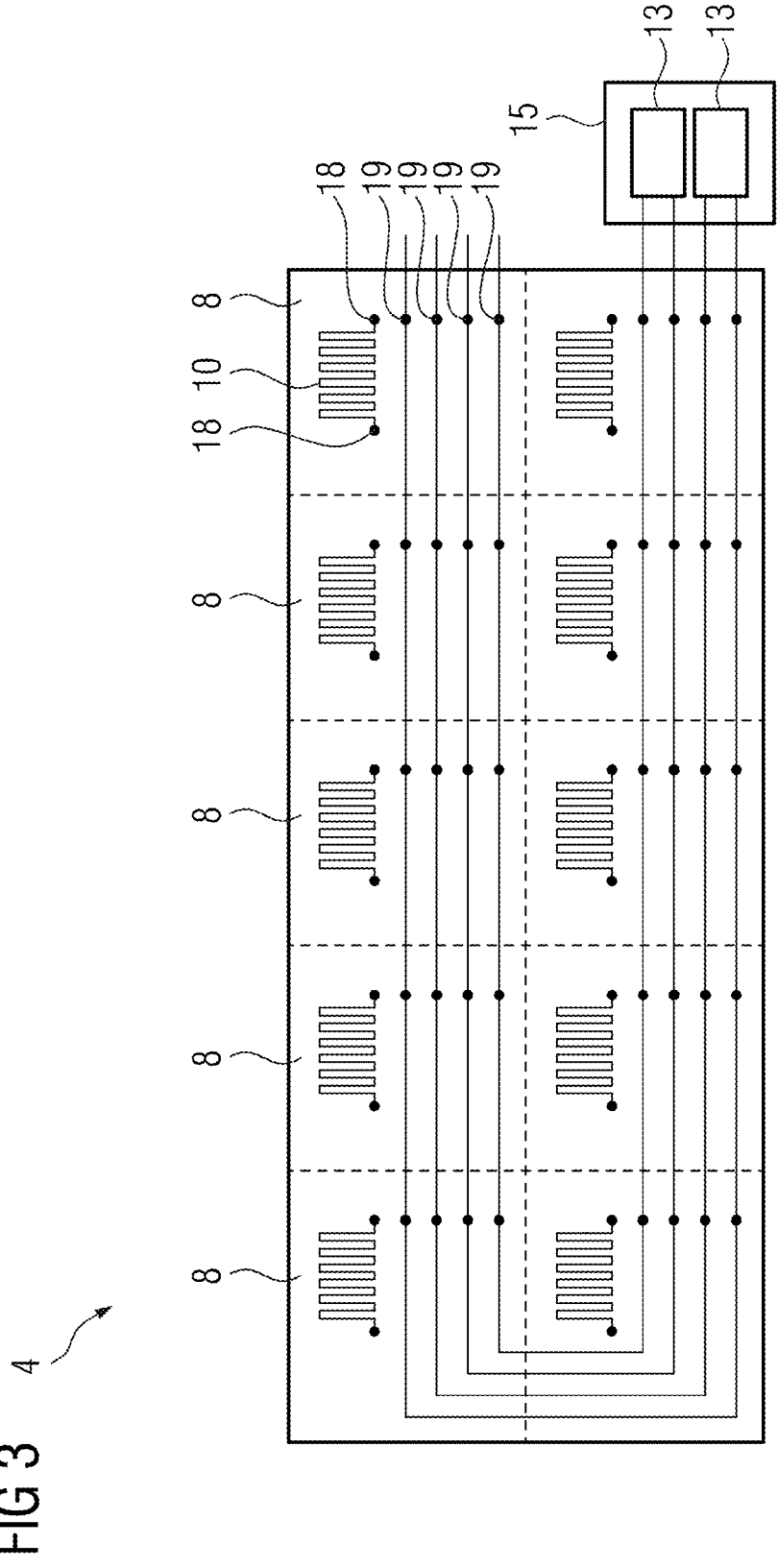
FIG. 3 shows a schematic representation of an embodiment variant of a heating layer as it can be configured in FIG. 2.

A heating layer 4 which can be used as in FIG. 2 is shown in more detail in FIG. 3. The heating layer 4 is subdivided into a plurality of partial heating regions 8, each of which has a heating element 10 in the form of a heating resistor. The number of partial heating regions 8 and their arrangement in the heating layer 4 is shown here purely by way of example. More or fewer partial heating regions 8 can also be provided. The partial heating regions 8 can also be configured differently.

Furthermore, the heating layer 4 comprises a first and a second feed line from a first and a second power supply unit 13. The first and second power supply unit 13 can be arranged, as indicated in FIG. 2, on a module electronics system 15 of the detector module 1. However, in other embodiment variants, other arrangements can also be provided.

For each partial heating region 8 of the heating layer 4, contacts 19 are provided on the first and second feed line from the first and/or second power supply unit 13. These contacts 19 are each contacted by the adapting unit 11 associated with a partial heating region 8 in the readout layer 3 of the stacked construction 5 (see FIG. 2).

Each associated adapting unit 11 in the example shown in FIG. 2 is therein implemented as a connecting unit 11 which is configured to connect the associated heating element 10 of the partial heating region 8 in a manner able to be switched at least either to the first or to a second power supply unit 13 and/or to the contacts 19 of the feed line associated with a respective power supply unit 13.

A connecting unit 11 associated with a heating element 10 of a partial heating region 8 is therefore firstly electrically conductively connected to the respective contacts of the feed lines and to the contacts 18 of the heating element 10 and is configured to connect either the one first feed line or the other second feed line to the heating element 10, so that the heating element 10 is supplied with power either by the first or the second power supply unit 13.

In the example shown, two power supply units 13 are provided. However, more than two, for example 3 or 4, power supply units 13 can be included by a detector module 1 according to one or more example embodiments of the present invention. The power supply units 13 are configured according to a preferred configuration as heating regulators which are supplied via a common voltage source 17 and, according to their setting, output voltage values for the power supply of the heating layer 4. The heating regulators 13 can be implemented, for example, as settable linear voltage controllers.

The connecting unit 11 associated with a respective heating element 10 of the heating layer 4 is, in the present example, configured integrated into the readout unit 7. The readout unit 7 therefore has circuit elements provided for it, which enable a connection of the heating elements 10 to a respective power supply unit 13.

The connecting units 11 of a group of heating elements 10 or all the heating elements 10 can be provided grouped or distributed in the readout unit 7.

A connecting unit 11 can be implemented in the form of one or more transistors. Furthermore, registers can be provided in the readout unit for activating it. The activation can be provided by way of configuration signals, for example, via an SPI BUS for the readout units 7.

Furthermore, an advantageous detector module 1, as indicated in FIG. 2, in the stacked construction 5 can have at least one temperature sensor 20, on the basis of which an activation of the adapting unit 11 can be implemented. Furthermore, the detector module 1 can have a control unit 22 which is configured to adapt the activatable adapting units 11 on the basis of a measurement value from the temperature sensor 20.

In the example shown, a plurality of temperature sensors 20 are advantageously provided so that a spatial distribution of the temperature in the stacked construction 5 can be better captured.

The control unit 22 can be implemented as an IC or also for instance as an FPGA (Field Programmable Gate Array in the (logic) gate arrangement). Herein, it is also arranged on a module electronics system 15. However, embodiment variants can also exist in which a readout unit 7 itself comprises circuit elements which enable activation. In the case shown, the control unit 22 or a further control unit can also be provided which also carry out an activation of the heating regulator 13 on the basis of a measured value from the temperature sensor (s) 20, so that herein apart from the connection of the heating matrix, the power levels needed for operating the heating layer 4 can also be adapted.

Figure 4:
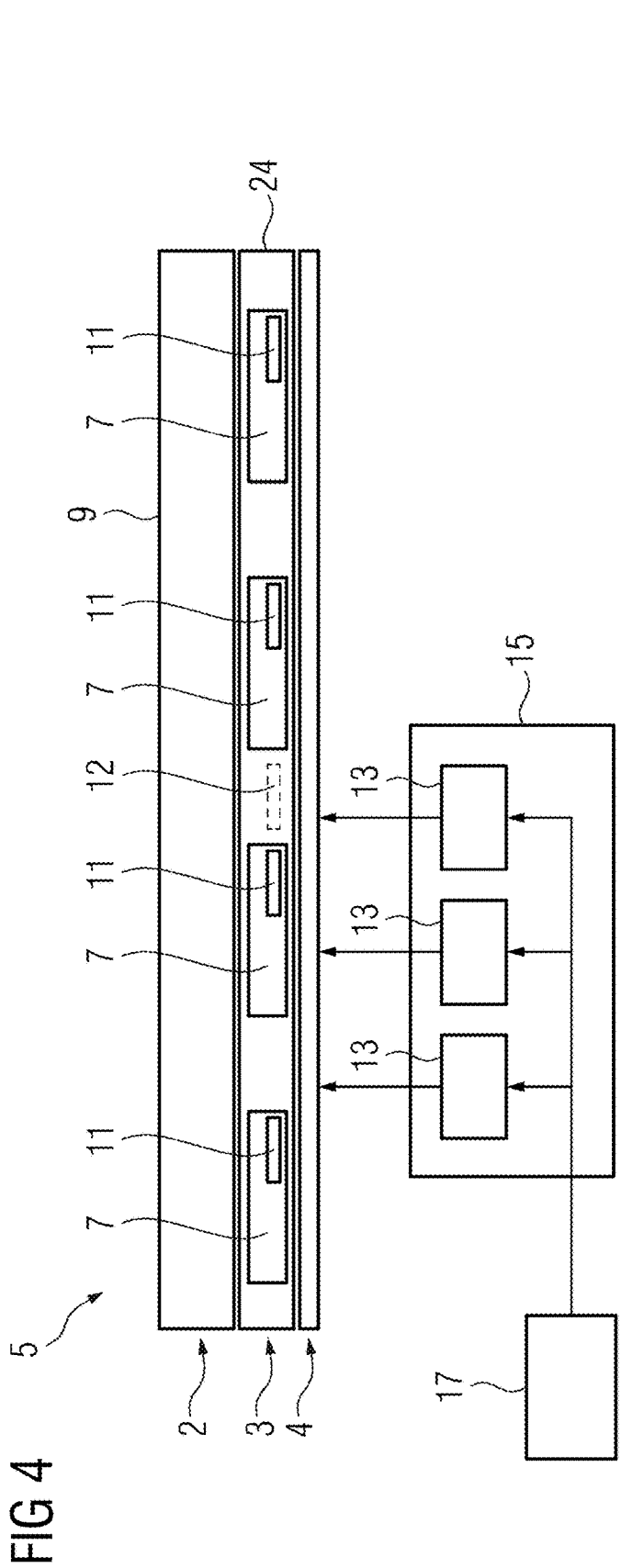
FIG. 4 shows a schematic representation of a stacked construction of a detector module according to a second embodiment variant.

FIG. 4 shows a schematic representation of a stacked construction of a detector module according to a further embodiment variant.

The implementation shown resembles the embodiment variant described in relation to FIGS. 2 and 3. However, in contrast to the implementation in FIG. 2, it has a readout layer 3 with a plurality of readout units 7 which are embedded together in an embedding material 24 to form a package.

Aside from a mounting on a surface of the readout layer 3 or on, or integration into, a carrier unit 21 (not shown here), the heating layer 4 can also be embedded in the embedding material 24 of the readout layer 3 itself.

The heating layer 4 can be configured corresponding to the schematic representation in FIG. 3, wherein however three heating regulators 13 are provided as power supply units so that a corresponding number of feed lines and contacts are provided in the heating layer 4.

The connecting units 11, 12 associated with the heating elements 10 of the heating layer 4 can be configured integrated into the readout units 7 similarly to FIG. 2. For example, circuit elements 11 are configured in groups for groups of heating elements 10, each in a readout unit 7 of the readout layer 3.

Alternatively thereto, it can also be provided that the connecting units for the heating elements 10 are provided as a circuit 12 separate from the readout units. This can advantageously be suitable, in particular, if it is provided that the connecting units 12 switch higher voltages than the readout unit 7. The connecting units 12 can then be produced in a separate semiconductor process and integrated in a package together with the readout units 7.

As explained in relation to FIG. 2, one or more temperature sensors 20 can be provided herein, on the basis of the measurement values of which, an activation of the connection can be implemented. Aside from an integration into a readout unit 7, a temperature sensor can also be present in an implementation, as here, separately in the readout layer 3.

Figure 5:
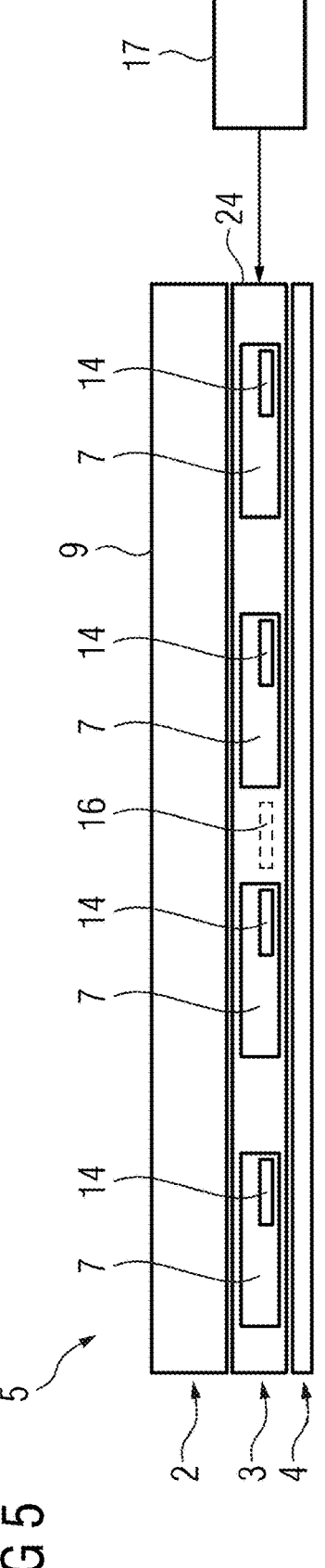
FIG. 5 shows a schematic representation of a stacked construction of a detector module according to a third variant.
Figure 6:
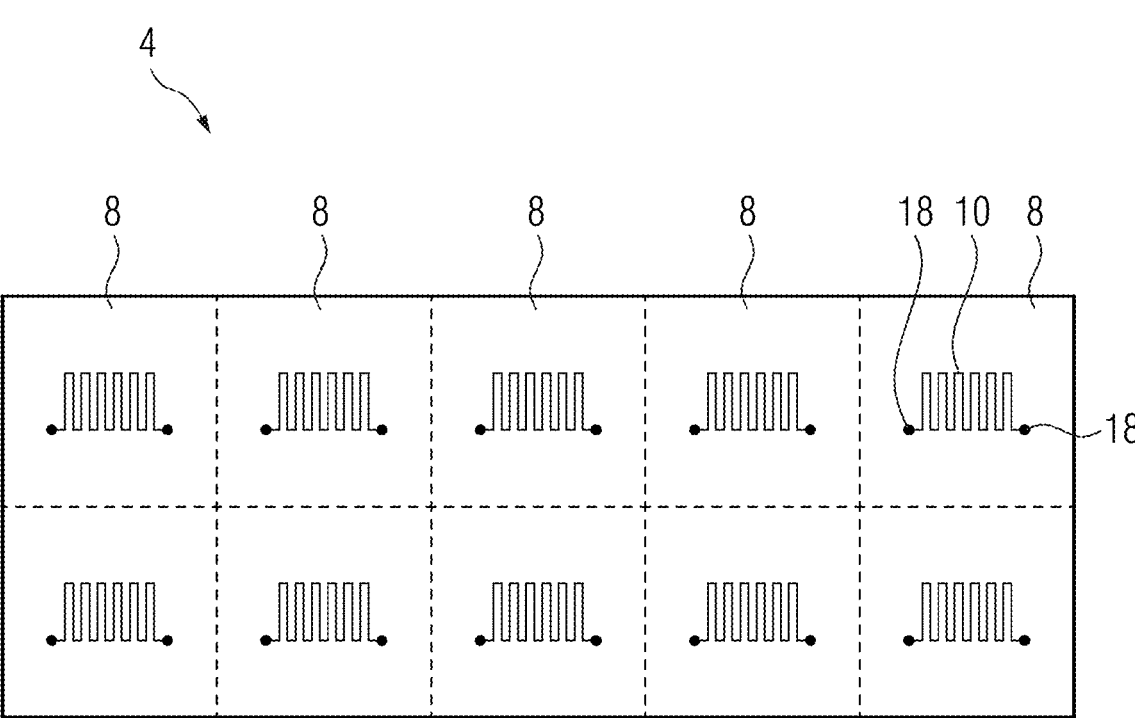
FIG. 6 shows a schematic representation of an embodiment variant of a heating layer as it can be configured in FIG. 5.

FIG. 5 shows a schematic representation of a stacked construction of a detector module according to a further variant.

Similarly to FIGS. 2 and 4, the stacked construction 5 shown has a sensor layer 2 comprising a converter element 9, a readout layer 3 and a heating layer 4.

The readout layer is configured, as in FIG. 3 comprising a plurality of readout units 7 which are embedded in an embedding material 24. However, in other embodiment variants, just one readout unit 7 can also be provided.

In contrast to the variants described above, the readout layer 3 does not have a connecting unit 11, 12 for each heating element 10, as described above, but rather, as an activatable adapting unit, has a heating regulator 14, 16 which is configured to adapt directly the power level fed to an associated heating element 10. They can be configured integrated into the readout units 7 or alternatively can also be present as a circuit 16 separate from the readout units 7. Preferably, the heating regulators 14, 16 are therein implemented as switching controllers.

Advantageously, only the feeding of power from a power source 17 is then necessary. This reduces the feed lines required and/or the contacts between the heating layer 4 and the readout layer 3. A heating layer 4 can then be configured simplified, as shown, for example, in FIG. 6, having only one heating element 10 per partial heating region 8, each being contacted via contacts 18 to the respectively associated adapting unit 14, 16 in the readout layer.

As explained in relation to variants described above, one or more temperature sensors 20 can also be provided herein, on the basis of the measurement values of which, an activation of the connection can be implemented.

The variants shown in FIGS. 2 to 6 each comprise a heating layer 4 which is arranged in the stacked construction 5 downstream of the readout layer 3, when viewed along an intended X-ray radiation incidence direction. An arrangement between the readout layer 3 and the sensor layer 2 is also conceivable, although a downstream arrangement can be advantageous for a fault-free signal transmission from the sensor layer 2 to the readout layer 3, exactly as for a simplified contacting.

Figure 7:
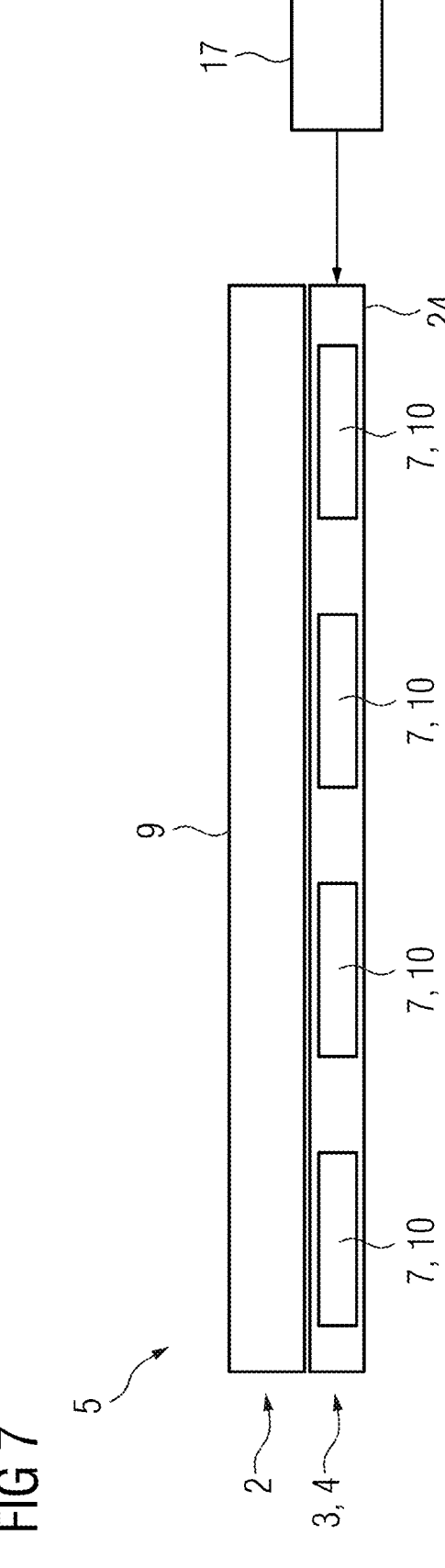
FIG. 7 shows a schematic representation of a stacked construction of a detector module according to a fourth embodiment variant.

FIG. 7 shows a schematic representation of a stacked construction 5 of a detector module 1 according to a fourth embodiment variant.

Herein, the readout layer 3 which has a plurality of readout units 7 itself serves as a heating layer 4, wherein circuit elements of the integrated circuits of the readout units

7 serve as heating elements 10, and wherein by way of an adaptation of the operational setting of the readout units 7, the power fed to each heating element 10 can be adapted.

The plurality of readout units 7 arranged in the readout layer thus represents a heating layer subdivided into partial heating regions, wherein the active circuits of the integrated circuits themselves serve as heating elements 10. Via changes in the operational settings of the individual readout units 7, for example, by way of a changed setting of bias currents, a power consumption can be specifically changed and thus a heating power generated can be adapted. Circuit elements for the activation, i.e. the adapting unit, can be integrated into the readout unit itself and activated via control signals for the readout unit. Such a configuration is particularly advantageous if only low heating power levels are needed.

Figure 8:
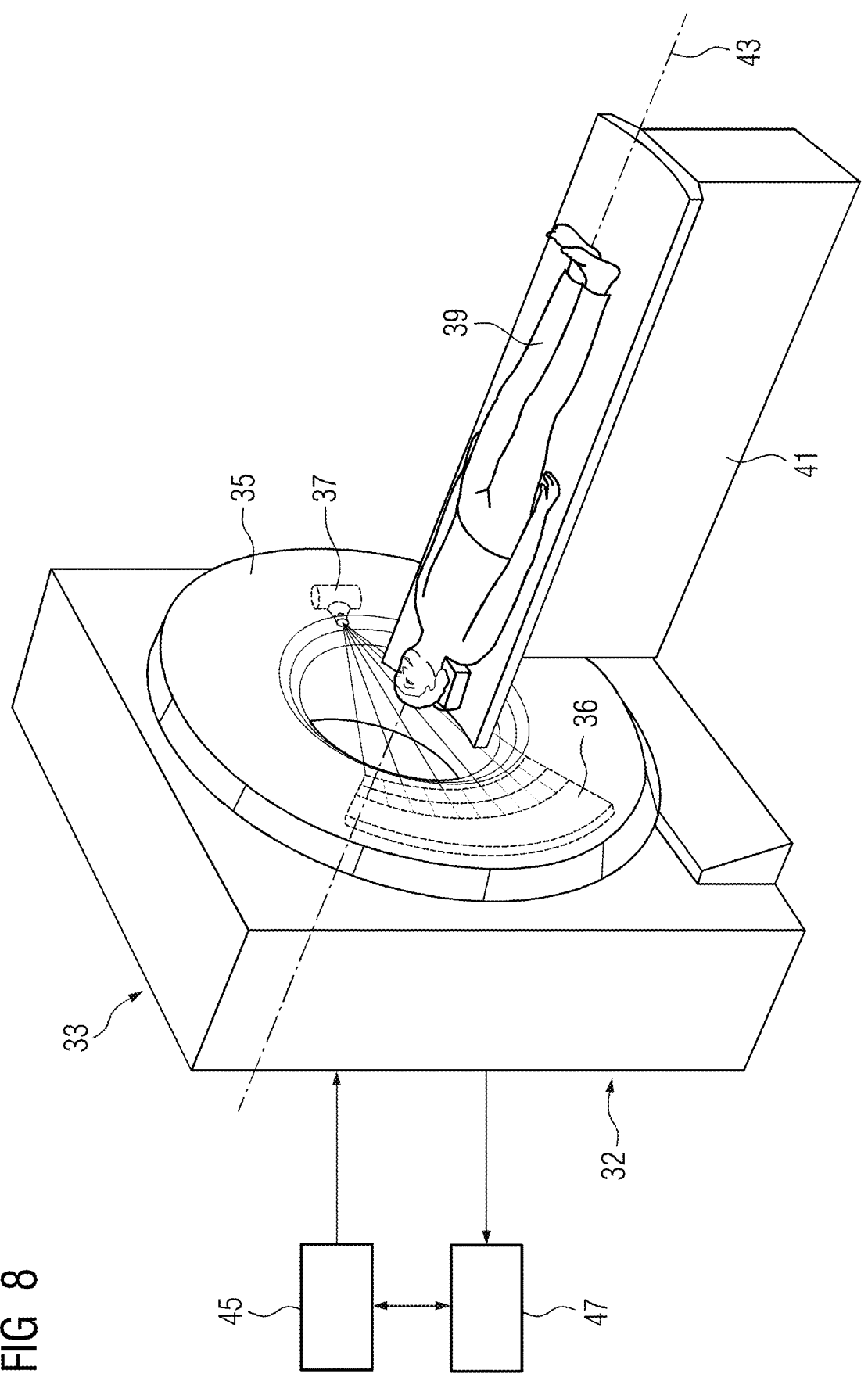
FIG. 8 shows a schematic representation of a medical imaging device.

FIG. 8 shows an exemplary embodiment of a medical imaging device in the form of a computed tomography device 32 with an X-ray detector 36 comprising at least one detector module 1 according to one or more example embodiments of the present invention and an X-ray source 37 placed opposite thereto. The X-ray source 37 is configured to irradiate the X-ray detector 36 with X-ray radiation. The X-ray source 37 and the X-ray detector is included by a gantry 33 and is arranged on a rotor 35. The rotor 35 is rotatable about the rotation axis 43. The examination object 39, in this case a patient, is positioned on the patient support 41 and is movable along the rotation axis 43 through the gantry 33. For the control of the computed tomography device 32 and/or for calculating sectional images and/or volume images of the object, a computing unit 45 is used. A reconstructing unit 45 in the form of a computer system is configured to reconstruct X-ray image data on the basis of the data from the X-ray detector 36 of the computed tomography device. A further computer system serves as an operator console 47. The software installed on the operator console 47 enables the operator to control the operation of the computed tomography device, for example, the selection of a protocol, the start of the scanning, etc. The reconstruction apparatus 45 and the operator console 47 can also be configured as a computer system.

The X-ray detector 36 of such a medical imaging device 32 can comprise, in particular, a plurality of detector modules 1. In particular, the detector modules 1 are then typically arranged adjoining one another at least in the rotation direction, so that by way of the stacking together of the respective sensor surfaces of the detector modules 1, overall an advantageously large total detection area can be provided.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element (s) or feature (s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. A detector module for an X-ray detector comprising, in a stacked construction:

a sensor layer configured to convert incident X-ray radiation into electrical signals;

a readout layer configured to read out the electrical signals from the sensor layer; and a heating layer, the heating layer including a plurality of heating elements spatially distributed in the heating layer and configured separately from one another for heating the sensor layer, the heating layer being subdivided into a plurality of partial heating regions, each partial heating region having at least one heating element being a heating resistor, wherein the readout layer has for each heating element an associated activatable adapting unit via which the respective heating element is contacted for feeding in power and which is configured to adapt the power fed to the respective heating element, the associated activatable adapting unit being an associated connecting unit configured to connect the respective heating element in a manner able to be switched at least either to a first power supply unit or to a second power supply unit, a first feed line from the at least one first power supply unit and one second feed line from the at least one second power supply unit is included by the heating layer, and for each partial heating region of the heating layer, contacts are provided on the first feed line and the second feed line enabling a contacting of the first feed line and the second feed line to the associated connecting unit in the readout layer.

2. The detector module of claim 1, wherein, the heating layer includes at least a portion of the readout layer and includes a plurality of readout units, the plurality of readout units being integrated circuits, wherein circuit elements of the integrated circuits form at least a portion of the plurality of heating elements, and wherein by way of an adaptation of an operational setting of the readout units, the power fed to each heating element can be adapted.

3. The detector module of claim 2, wherein the sensor layer comprises a direct-converting converter element.

4. The detector module of claim 2, wherein at least one temperature sensor is in the stacked construction and the detector module has at least one control unit configured to adapt the activatable adapting units on a basis of a measurement value from the temperature sensor.

5. The detector module of claim 1, wherein the readout layer has a number of readout units being integrated circuits and wherein the activatable adapting units are integrated into at least one readout unit of the number of readout units.

6. The detector module of claim 1, wherein the readout layer has a number of readout units being integrated circuits and wherein the activatable adapting units are a circuit separate from the readout units.

7. The detector module of claim 1, wherein the heating layer is on a surface of the readout layer or is embedded in an embedding material of the readout layer.

8. The detector module of claim 1, wherein the heating layer is on a surface of a carrier unit downstream in a stacked arrangement of the readout layer along a radiation incidence direction or is embedded in a material of the carrier unit.

9. The detector module of claim 1, wherein the sensor layer comprises a direct-converting converter element.

10. The detector module of claim 1, wherein at least one temperature sensor is in the stacked construction and the detector module has at least one control unit configured to adapt the activatable adapting units on a basis of a measurement value from the temperature sensor.

11. An X-ray detector for recording images of an object transirradiated by X-ray radiation, comprising:

a plurality of detector modules arranged adjoining one another, each of the plurality of detector modules being the detector module of claim 1.

12. A medical imaging device comprising at least one of the detector module of claim 1 and an X-ray source placed opposite thereto, wherein the X-ray source is configured to irradiate the detector module with X-ray radiation.

\* \* \* \* \*